(12) United States Patent
O'Donnell et al.

(10) Patent No.: US 7,024,689 B2
(45) Date of Patent: Apr. 4, 2006

(54) GRANTING ACCESS RIGHTS TO UNATTENDED SOFTWARE

(75) Inventors: William O'Donnell, Westford, MA (US); Daniel Wilks, Santa Clara, CA (US)

(73) Assignee: Intuit, Inc., Mountain View, CA (US)

( * ) Notice: Subject to any disclaimer, the term of this patent is extended or adjusted under 35 U.S.C. 154(b) by 167 days.

(21) Appl. No.: 10/318,569

(22) Filed: Dec. 13, 2002

(65) Prior Publication Data

US 2004/0117615 A1    Jun. 17, 2004

(51) Int. Cl.
*G06F 11/33* (2006.01)

(52) U.S. Cl. .................... 726/4; 709/218; 709/219; 707/1; 707/9

(58) Field of Classification Search ............ 707/1, 707/9; 709/218, 219, 200, 203, 201, 229, 709/225, 217; 726/4; 713/200–202
See application file for complete search history.

(56) References Cited

U.S. PATENT DOCUMENTS

| | | | |
|---|---|---|---|
| 5,742,759 A * | 4/1998 | Nessett et al. | 713/201 |
| 5,941,947 A * | 8/1999 | Brown et al. | 709/225 |
| 6,049,877 A * | 4/2000 | White | 713/201 |
| 6,279,111 B1 * | 8/2001 | Jensenworth et al. | 713/200 |
| 6,516,416 B1 * | 2/2003 | Gregg et al. | 713/201 |
| 6,615,258 B1 * | 9/2003 | Barry et al. | 709/223 |

* cited by examiner

*Primary Examiner*—Gregory Morse
*Assistant Examiner*—Tongoc Tran
(74) *Attorney, Agent, or Firm*—Fenwick & West, LLP

(57) ABSTRACT

An access site allows a client application to access a server application on behalf of a subscriber who has an account at the client site. A client application registers with the access site and receives a certificate for the client application. A subscriber is directed to the access site upon an indication that she would like to use the features of the client application that integrate with the server application. The subscriber specifies access rights to the access site, and issues a validation token in association with the specified access rights. When the client site needs the server application to process subscriber data, it forwards the validation token to the access site, using the certificate. The access site validates this information, and where appropriate the server application processes the subscriber data and returns the results to the client application.

56 Claims, 7 Drawing Sheets

GRANTING ACCESS RIGHTS TO UNATTENDED SOFTWARE

BACKGROUND OF THE INVENTION

1. Field of the Invention

This invention relates generally to software and data access rights, and more particularly to securely granting access rights to unattended software.

2. Description of the Related Art

Various computer applications, which perform some specified function for a user or program, are well known. Applications include those that provide databases, spreadsheets, word processing, and many others. Typically, a document or file made using an application will include some user data. For example, a financial services application allows a user to develop and maintain a database for their various financial activities.

Some conventional applications reside entirely in a desktop computer, and process data found on the same computer and on a network. Others operate in a network environment, and reside on workstations, servers or both, with access to applications being well controlled by a network administrator.

Online (e.g., web based) applications reside on servers that may be variously accessed by users, who may also be referred to as subscribers. These servers may also store subscriber data, or communicate with related servers that store such data. One advantage of online applications is access flexibility. That is, a client computer having conventional web browsing capability can be used to access an online application. This allows businesses to set up applications that various employees can access, without requiring the business to set up elaborate computer networks. For example, a business can establish a database, allowing employees from multiple disconnected offices, from home offices, and/or from the field to access the database, without requiring the employees to be on the same private network, and without requiring specialized hardware. Any employee accessing a web-enabled device could theoretically access the common database. Also, if there are updates to the configuration of the database, or application upgrades, the business owner does not need to be considered with updating numerous computers according to the upgrade. Thus, online applications have been found to be very desirable.

Some applications are used by other, related applications, to provide a necessary foundation for a functionality that they provide, or for other reasons. This may be referred to in terms of a client-server relationship, wherein a client application is a requestor of some functionality provided by a server application.

Application service providers are companies that host on their own servers various applications and store data for corporate subscribers. The subscribers use a local client application (e.g., a generic browser or specific lightweight client interface) to access the server based applications and data. This existing model is a two party transaction model between the local client and the server application.

However, the two party ASP model can be extended to a three-party transaction. In this model, a third party "client" application exists separately and independently of the server applications and subscriber data. The subscriber separately subscribes to the client application in order to obtain its functionality. For example, a subscriber may use a server-based accounting application provided by accounting firm, and may store all of its data at the accounting firm's data server. In addition, the subscriber may have a separate relationship with a third party payroll provider, which hosts a payroll application. The subscriber may desire to have the payroll application access the subscriber's data at the accounting data server, thereby acting as a client application to the accounting server. There are several advantages to this architecture. For one, it is modular, and therefore flexible in terms of building and enhancing applications. It also provides an environment in which software developers can be encouraged to create different uses of the application, expanding existing markets and allowing penetration into new markets for the server application. The subscriber is free to choose different applications from different application providers, and yet keep its corporate data or information resident in a limited number of locations.

One continuing need with online applications is subscriber data management. In the two party transaction model, data management is relatively straightforward. The server application is configured to provide access only to authorized subscribers (users) who sign in through names and passwords. Because the service provider's applications are the only ones that can programmatically access the subscriber's data, there is little or no need for application level data security or management, since it is assumed that the service provider's applications are trusted.

Such is not the case in a three party model, where an independent, third party client application is attempting to access a subscriber's data at the service provider. Continuing the above example, first it is necessary for the server based accounting application to validate that the third party payroll application is authorized to access the subscriber's data. Even if the third party payroll application is authorized by a subscriber to communicate with the server based accounting application that controls the subscriber's corporate data, the subscriber might want to control the specific details of the payroll application's access to accounting data, and may further want to control access to such data in different ways for different users. Third, there is the converse problem of the third party application ensuring that its use by the subscriber on the server data is authorized, that is, that the subscriber is in fact a legitimate subscriber of the server application's functionality and data hosting services. These various distinct types of control and management are currently not met by conventional client-server systems.

Thus, while online applications allow great flexibility and other advantages, it would be desirable to allow subscribers improved control over the granting of access rights corresponding to their applications and underlying subscriber data.

SUMMARY OF THE INVENTION

The present invention improves on the ability of subscribers to grant access rights, particularly in environments where client applications request server applications to process subscriber data on behalf of subscribers.

In one embodiment, the present invention allows subscribers to grant access rights to a client application in a system where a subscriber uses a client application to access a server application. An access site accommodates the granting of access rights, acting as a neutral broker between the client and server applications.

Initially, application developers correspond with the access site to reserve names and receive corresponding certificates for client applications that they develop. These certificates are subsequently used as part of securely granting access to the server application by the client application.

Specifically, the certificate is used to ensure that subsequent communications securely originate from the client application.

A subscriber navigates to the client application (typically residing at a web site referred to as a client site), and requests features of the client application that implement the server application. This request can be variously made. For example, it can be a selection of a server application based feature that is presented at the client site, part of a more formal registration, and the like.

After such a request, the subscriber is taken through steps that allow the subscriber to grant permission to a client application to access the server application. The granted permission can be variously defined. For example, the subscriber may grant permission for a payroll application to access an accounting application. However, the subscriber may not want the payroll application to be able the access certain accounting data. Further, the subscriber may want to require an authorized user to login prior to granting a request to process subscriber data.

Embodiments of the present invention variously ensure that access rights are securely granted, and that subsequent client application requests to process subscriber data through the server application are securely allowed.

When the subscriber requests client application features that integrate with the server application, the client application gives the subscriber a unique confirmation code. Separately, the client application transmits the same confirmation code to the access site. The client application also causes the subscriber to be redirected to the access site with the confirmation code. The access site compares the confirmation codes received from the subscriber and the client application, verifying that they match, and thereby verifying that the subscriber is legitimately seeking to contact the server application based upon the previous exchange with the client application. Preferably, the confirmation code is sent by the client application to the server application using a security mechanism (e.g., SSL) that implements the previously issued certificate. This provides assurance to the server application that the confirmation code has been sent by the client application.

After verifying legitimate contact, the access site provides information explaining the access that the client application is requesting, and then allows the subscriber to specify a set of access rights for the client application.

In one embodiment, this involves the access site redirecting the subscriber to the server application, which then communicates with the subscriber to establish the set of permissions, and associates them to a proxy account. Once these details are established, the server application reports back to the access site, confirming that the proxy account has been established. The access site retains information identifying the existence of the proxy account, but does not need to keep the particular details of the proxy account that are kept by the server application.

After the set of permissions is specified, the access site issues a validation token, which is provided to the client application. The client application can subsequently use the validation token to access the server application on behalf of the subscriber, within the limits defined by the set of permissions.

In one embodiment, the subscriber also has the option of associating login security to the set of permissions. This means that before exchanging data two validation tokens must be presented by the client application to the server application. The first validation token is the one described above. It proves that someone has given permission for the client application to request services from the server application. A second validation token indicates that an authorized user has given permission (e.g., logged in) for a particular data exchange to occur. This can be referred to as a user validation token.

The login security option is preferably presented at the time that a proxy account is being created. When login security is selected the subscriber is allowed to choose which particular users of the server application have the right to authorize the data exchange.

Where applicable, the client application is informed that login security is required when it attempts to exchange data. The client application makes the initial request to the access site and presents the account validation token. If login security is enabled in association with the validation token, a message indicating that user login is required is sent to the client application. The client application then causes the user to be directed to the login screen on the access site, where they are prompted to present personal credentials. If the user is on the list of particular authorized users previously designated by the subscriber, as confirmed by receipt of appropriately identified credentials, they are given the user validation token as proof of their login. The authorized user provides the user validation token to the client application. The client application then presents it to the access site/server application. At this point the data exchange can take place.

The present invention can be embodied in various forms, including various computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1A:
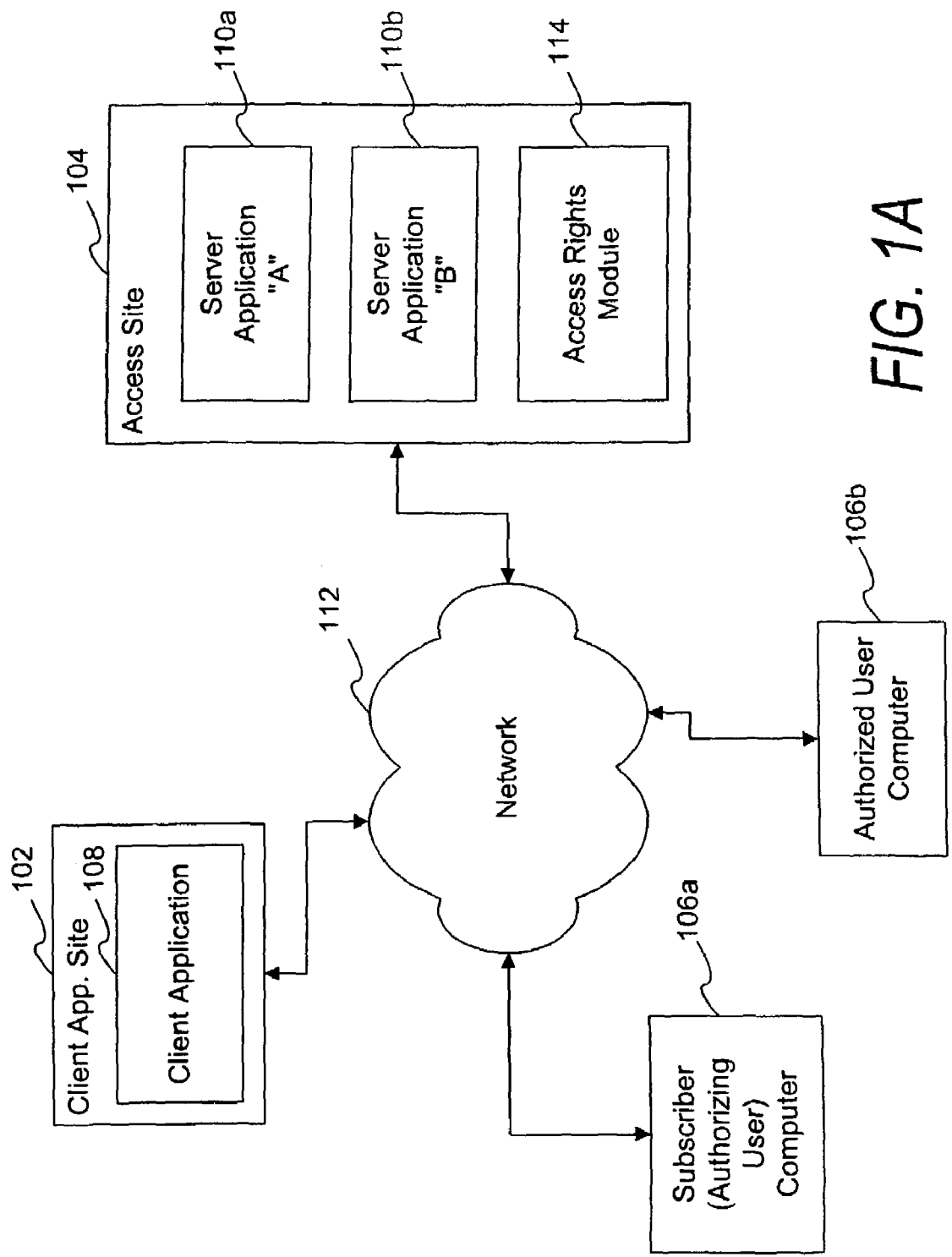
FIGS. 1A–B are schematic diagrams illustrating examples of systems in which embodiments of granting access rights operate in accordance with the present invention.

FIG. 1A illustrates an example of a system 100 in which an embodiment of granting access rights operates. The system 100 includes a client site 102, an access site 104, a subscriber computer 106a, and an authorized user computer 106b, which are preferably embodied as computers that communicate with each other using conventional network technologies and protocols. For example, the subscriber and authorized user computers 106a, 106b can be conventional personal computers running an operating system such as Microsoft Windows™, available from Microsoft Corporation of Redmond, Wash. The subscriber computer 106a and authorized user computer 106b are connected to the network 112, such as the Internet, also using conventional technology such as through a dial up modem, cable modem, digital subscriber line (DSL), T1, T3, or other network connection, and communicate with other resources such as the client site 102 and access site 104 using conventional protocols such as TCP/IP, HTTP, FTP, and others. Furthermore, the subscriber and authorized user computers 106a, 106b may include a browser, such as Microsoft Internet Explorer, that facilitates and provides an interface through which communications with the network resources are made. Alternatively, it is well known that conventional Internet connectivity capabilities can be embedded in any type of software application, such that the user can access sites on the Internet from within the context of the software application, without the need to invoke a browser application. The term subscriber is used for ease of description, and generally refers to any authorizing user. It is not meant infer or require a formal subscription to have been arranged, and does not infer or require a subscription software model.

Similarly, the client site 102 and access site 104 include components for communicating with each other and the subscriber and authorized user computers 106a, 106b through the network 112. The access site 104 and client site 102 respectively include server applications 110a,b and a client application 108. The server applications 110a, 110b are preferably network-based software applications. With network-based software applications, client computers communicate with application servers to perform the functionality associated with the software, as opposed to conventional client-based applications, wherein data is stored and processed locally on a computer. With network-based applications, subscriber data may be entirely stored on the server on which the application resides, such as the access site 104 server or one on which a server application separately resides. Alternatively, a subset of the subscriber data may be stored on such a server, with other subscriber data being stored on the subscriber's computer. Still further, redundant storage of subscriber data may entail processing of a version of subscriber data that is periodically sent to another server for back up purposes.

Network-based software applications may also be referred to as online or web-based applications, particularly where the Internet is involved. For ease of description, the server applications may also be referred to as online applications herein. An example of network-based application is Quickbooks® Online Edition, available from Intuit Inc. of Mountain View, Calif.

The client application 108 is also an online application. The client application 108 relates to a server application and thus may also be referred to as a related application. The relationship between the client application 108 and server application 110a,b will vary. For example, the client application 108 may be an explicit "plug in" that enhances the server application but does not have significant independent functionality, or the client application 108 may be an independent application where data exchange of some kind with the server application 110a,b enhances the value of both applications. Preferably, an application developer creates and clients the related application 108. An example of a client application is one built using the Quickbooks® Software Development Kit (SDK). While only one client application 108 is shown in FIG. 1, in practice there will be many different client applications 108 operating to access subscriber data controlled by the access site 104.

Figure 1B:
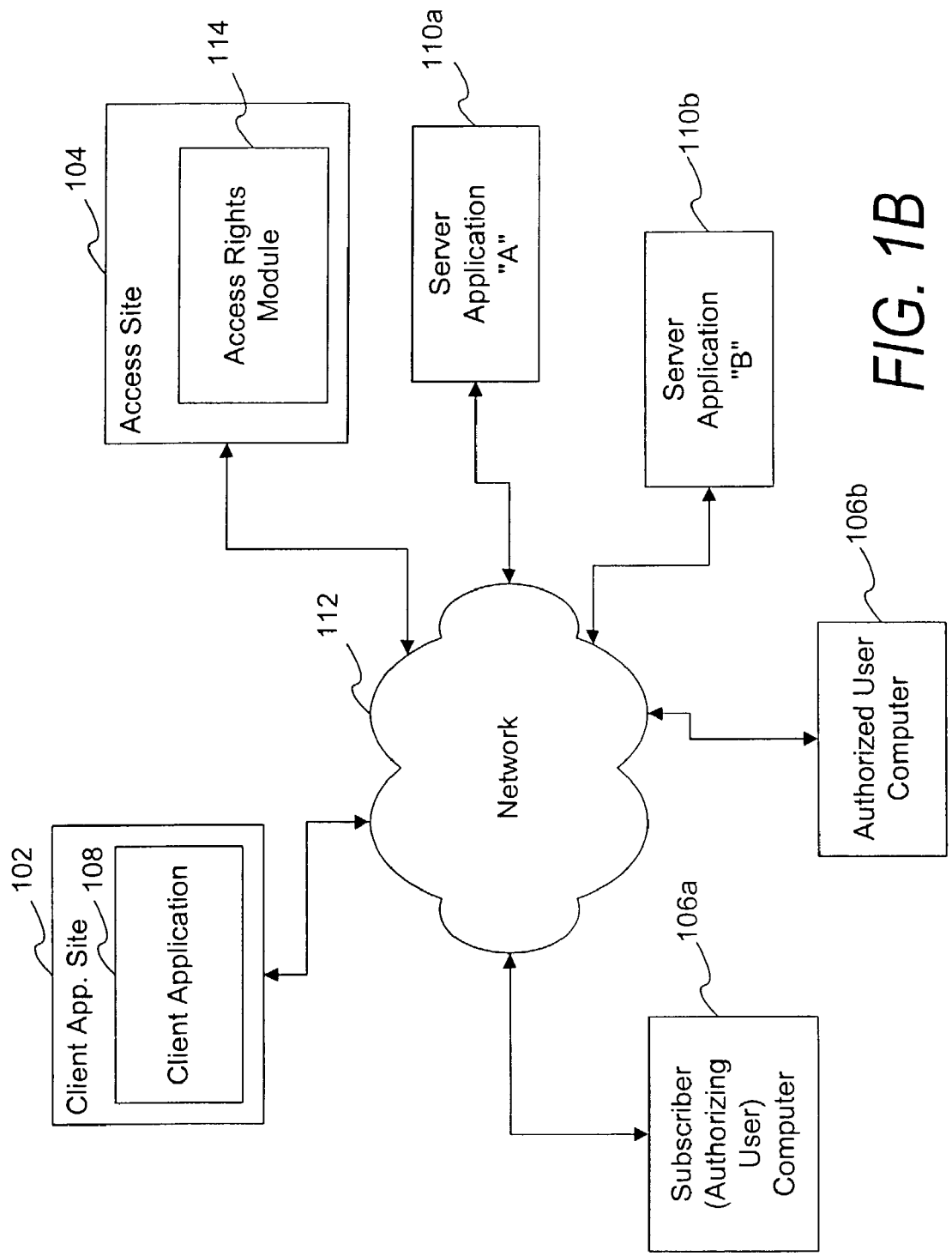

The access site 104 coordinates the registration of subscribers and application developers. The access site 104 is shown to logically include the server applications 110a,b, although they do not necessarily, and most likely do not physically reside on the same server; the access site 104 need only be able to manage access to the server applications, regardless of where the server applications reside. FIG. 1B is analogous to FIG. 1A, with the server applications 110a,b being shown to reside outside the access site 104.

Although a single server application 110a can be associated with the access site 104, multiple server applications 110a,b are shown to illustrate that the access rights module 114 functionality can be used to manage access to any number of different applications, and that the access rights functionality provided by the access rights module 114 may be easily be applied to new applications as they are introduced into the system. Often, although not necessarily, a primary vendor will want to maintain control over the server application(s), the access site, and the development SDKs or platforms used by application developers to create client applications. This is among the reasons that it is desirable for the access site 104 to ensure that access by a client application 108 is legitimate and permitted by the subscriber whose data is being accessed.

A client application 108 accesses a server application 110a on behalf of a subscriber. For a given client application 108, a subscriber operates the subscriber computer 106a to grant particular access rights to the client application 108. The subscriber may also require a login security mode, wherein an "authorized user" must submit login credentials in order for the client application to exercise the access rights. The authorized user may be any person that is registered with the server application for the subscriber, or a set of particular authorized users may be selected, such as through a conventional check off box based interface.

For example, assume server application "A" is an online accounting package. The subscriber may be a small business owner who uses the server application to manage the business' books. The client application 108 in this example could be an analytical tool that evaluates the business' accounts receivables, or a payroll application that needs to access some, but not all of the subscriber data managed by the accounting application to perform certain payroll functions. The subscriber can grant the client application access the server application according to defined access rights limitations. The access rights can be variously configured, such as by limiting access to a particular server application function, subscriber data, or both. This system allows application developers to create client applications that have new functionality beyond what the server application can do, which may or may not include access to certain types of subscriber data.

As indicated, when a subscriber grants access rights to a client application, the subscriber can also require login security. For example, a small business owner may by the subscriber, operating the subscriber computer 106a, and an accountant may be the authorized user, operating that computer 106b. The system 100 of FIG. 1 discloses a scenario wherein these computers 106a,b each independently access the client application 108 through the network 112, preferably the Internet. Various configurations, such those involving some employees operating workstations on a business' local area network, some contractors operating computers outside the local area network, and other end users, may also be provided.

The access rights module 114 provides the functionality that allows subscribers to grant access rights to client applications 108 that will access server applications 110 on behalf of a subscriber. The access rights module 114 is preferably provided as software, but may also comprise hardware and firmware components, or combinations thereof.

The access site 104, configured to include the access rights module 104, allows the client application 108 to access a server application 110*a* on behalf of a subscriber. Prior to such access by subscribers, developers register the client applications that they create, and receive in return a certificate. Preferably, this registration process is undertaken between the access site 104 and the developers (using the client site). Each client application 108 is given a unique certificate. These certificates are later used as part of the process of securely granting access to the server application 110*a* by the client application 108, as described further below.

A subscriber navigates to the client site 102 and provides an indication that they would like to enable the features of the client application that integrate with the server application 110*a*. This indication may be variously made. For example, the subscriber may be a long time user of the client application 108, and the client site may notify users of a new feature that integrates with the server application. Alternatively, the client application may have been set up solely as a newly developed application whose existence depends on the server application. The vehicle through which the indication is made may also vary. For example, conventional user interfaces (e.g., an "OK" button, etc.) may simply receive the indication. Alternatively, some formal registration information may be collected by the client application.

Regardless, when the client application receives the request or indication that the subscriber would like to implement the client-server application features, the client site 102 sends a confirmation code to the access site 104 and to the subscriber, redirecting them to the access site 104. The confirmation code can be any format, such as a number or alphanumeric string, and will typically defined according to the desires of the client application developer.

When the subscriber contacts the access site 104 with the confirmation code, the access site 104 ensures a match with the confirmation code sent by the client site 102. The access site compares the confirmation codes received from the subscriber and the client application, verifying that they match, and thereby verifying that the subscriber is legitimately seeking to contact the server application based upon the previous exchange with the client application. As a further measure of security, the communication of the confirmation code from the client site 102 to the access site 104 is authenticated as having come from the registered client application using the previously issued certificate. For example, a conventional SSL communication that uses the certificate can be implemented.

The access site 104 then engages in an exchange with the subscriber wherein information about a specified set of access rights to be given to the client application is collected. Although in many circumstances the client application will be able to unilaterally exercise these access rights once the following procedure is completed, in some circumstances the subscriber may also require a person to log in as a condition of allowing the client application to have the defined access. For example, the subscriber may grant permission for a payroll application to access an accounting application. However, the subscriber may not want the payroll application to be able the access certain accounting data without additional, explicit permission from a particular authorized user of the accounting application. An authorized user can be a single user. Alternatively, it may be a group of selected user, or any user from a group of users registered or otherwise recognizable by the server application. Where this feature is associated to the access rights, a user submits credentials to allow the client application use of the server application according to the access rights.

In any event, after verifying legitimate contact as described above, the access site initially provides information to the subscriber indicating the type of access that the client application is requesting. The access site and server application then operate to allow the subscriber to specify the access rights. The mechanism through which the access rights are specified and managed can be referred to as a proxy account, although such is not required in order to practice the present invention. In one embodiment, this involves the access site redirecting the subscriber to the server application, which then communicates with the subscriber to establish the details of the proxy account, including an identification of particular access rights being granted, and a determination of whether login security is required. Where login security is required, the subscriber may select from among a list of users recognized by the server application (e.g., from previous registration of such users with the server application), or may simply indicate that all recognized users.

The access rights themselves can be variously defined, and will generally be dictated according to the conventional access rights capabilities of the server application. For example, with an online accounting application, there may be three major areas of access rights, such as (1) all accounting data, (2) only accounts receivable, and (3) only accounts payable, from which the subscriber could select. The access rights determination may be limited to selection from these categories, or could be further broken down. For example, a subscriber may specify the access rights to cover the ability to read payroll data, or read, edit, and modify accounts receivable data in the online accounting application example. Once these details are established, the server application reports back to the access site, confirming that the proxy account has been established.

The access site retains information identifying the existence of the proxy account, but does not need to keep the particular details of the proxy account that are kept by the server application. After receiving confirmation of the establishment of the proxy account, the access site issues a validation token, which is provided to the client application. The client application uses the proxy account to access the server application on behalf of the authorized user, within the limits defined therein. The validation token is used to ensure appropriate implementation of the proxy account by the client application, and thus provides protection to the subscriber by ensuring that the client application has authorized access to the subscriber's data.

As indicated, when setting up the proxy account, the authorizing user can indicate that they want to enable "login security" on the connection between the client and server applications. This means that before exchanging data two validation tokens must be presented by the client application to the server application. The account validation token proves that someone has given permission for the client application to request services from the server application. A second "user" validation token requires a particular authorized user to login prior to allowing the client application to make a particular data exchange.

The login security option is preferably presented at the time that a proxy account is being created. When login security is selected the subscriber is allowed to choose which particular authorized users (or, "all") of the server application have the right to authorize the data exchange. These particular authorized users will have a mechanism for identifying themselves, preferably in the form of credentials unique to a particular authorized user.

The client application 108 is informed that login security is required when it attempts to exchange data and login security is enabled. Specifically, the client application makes the initial request to the access site and presents the first validation token, and then an indication that user login is required is sent to the client application 108. The client application 108 directs the user to the access site to login, wherein she provides her credentials to confirm that she is an authorized user. If the authorized user is on the list of users previously designated by the subscriber, and appropriate credentials are submitted, the access site issues a second validation token proving login by a qualified user. The second validation token is provided to the client application 108, preferably from the authorized user, and then presented to the access site/server application by the client application 108. At this point data exchange can take place, with the access rights are defined according to the previously arranged proxy account corresponding to the validation token.

Figure 2A:
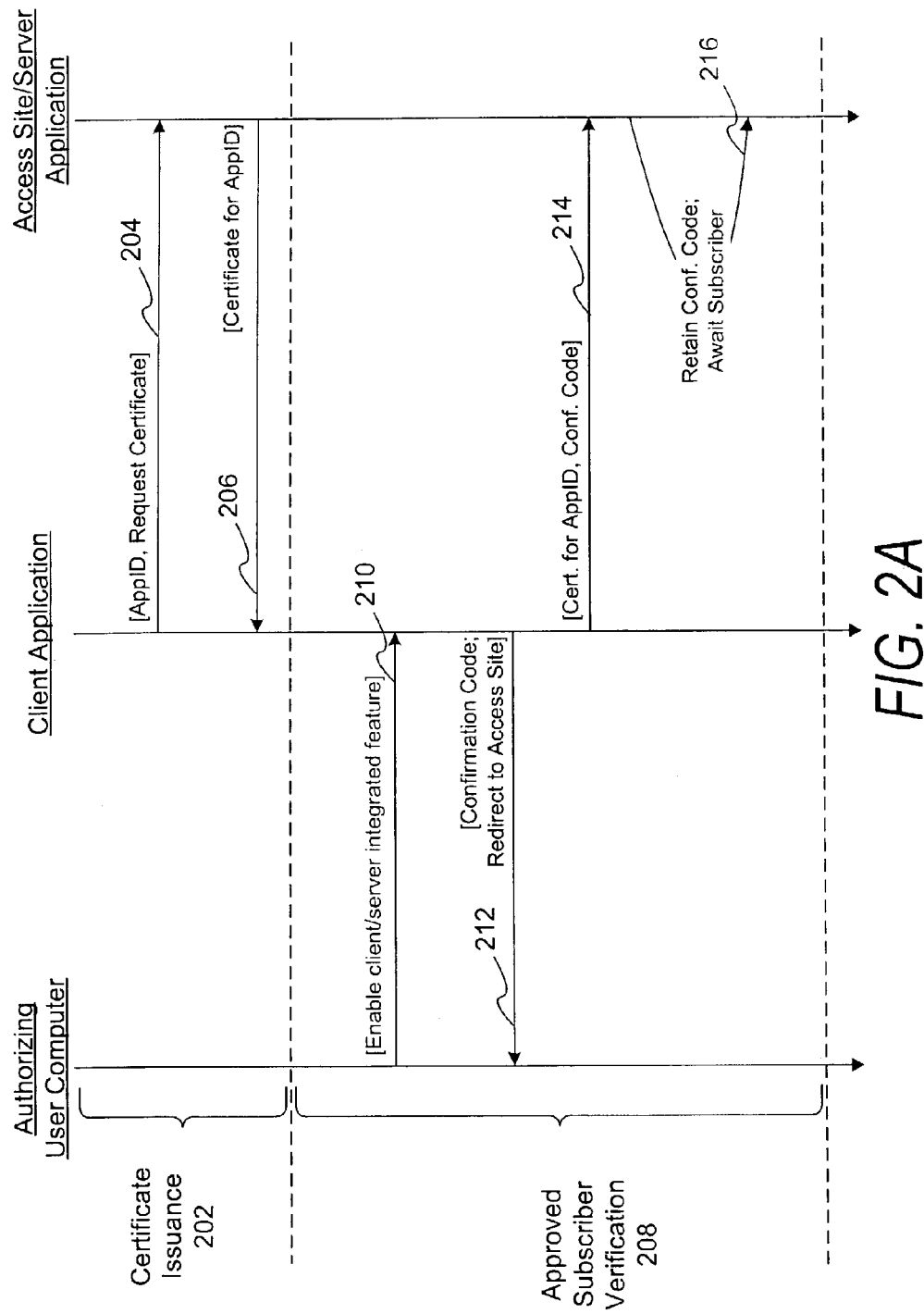
FIGS. 2A–C are event diagrams illustrating an embodiment of granting access rights in accordance with the present invention.
Figure 2B:
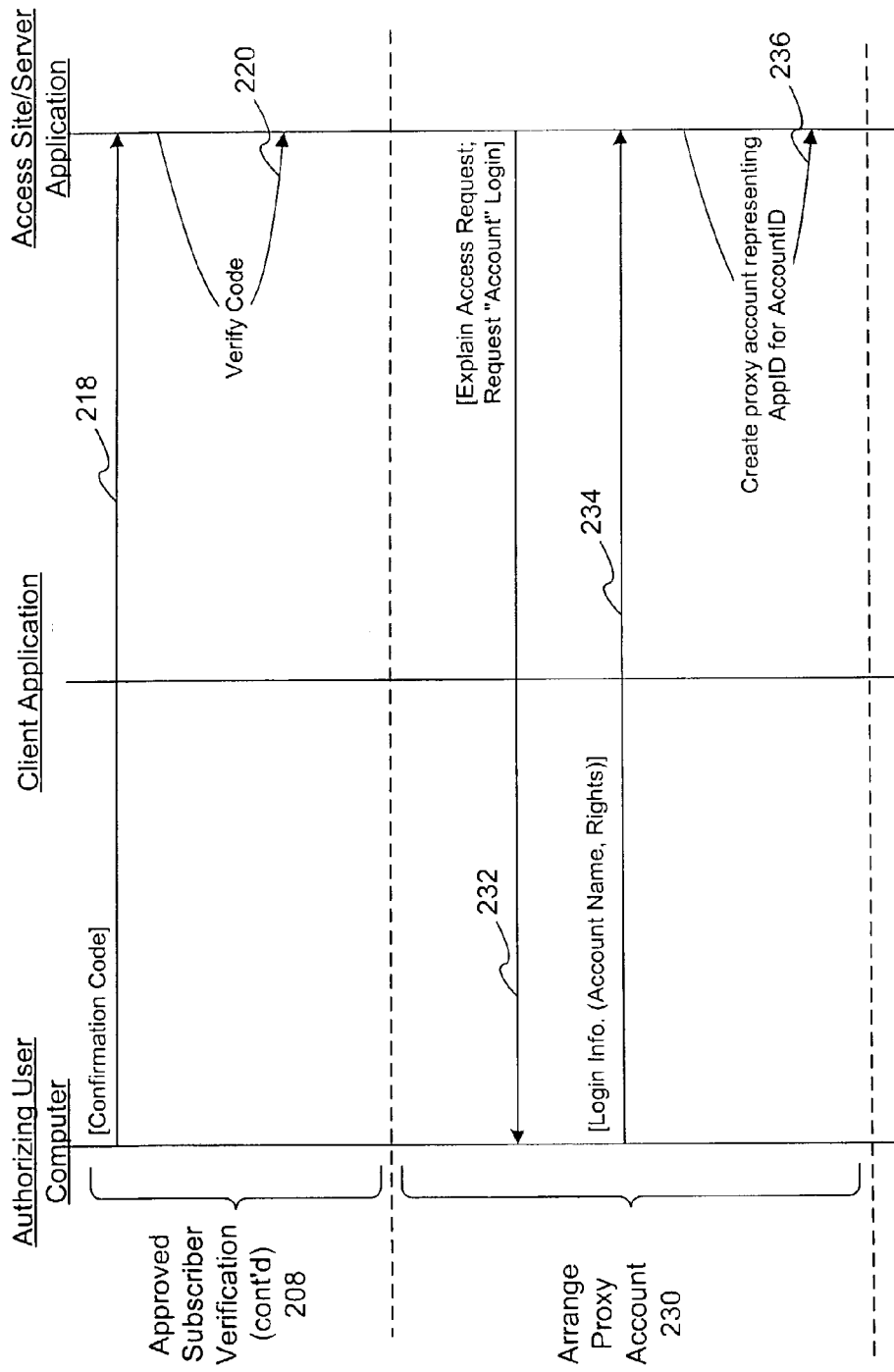
Figure 2C:
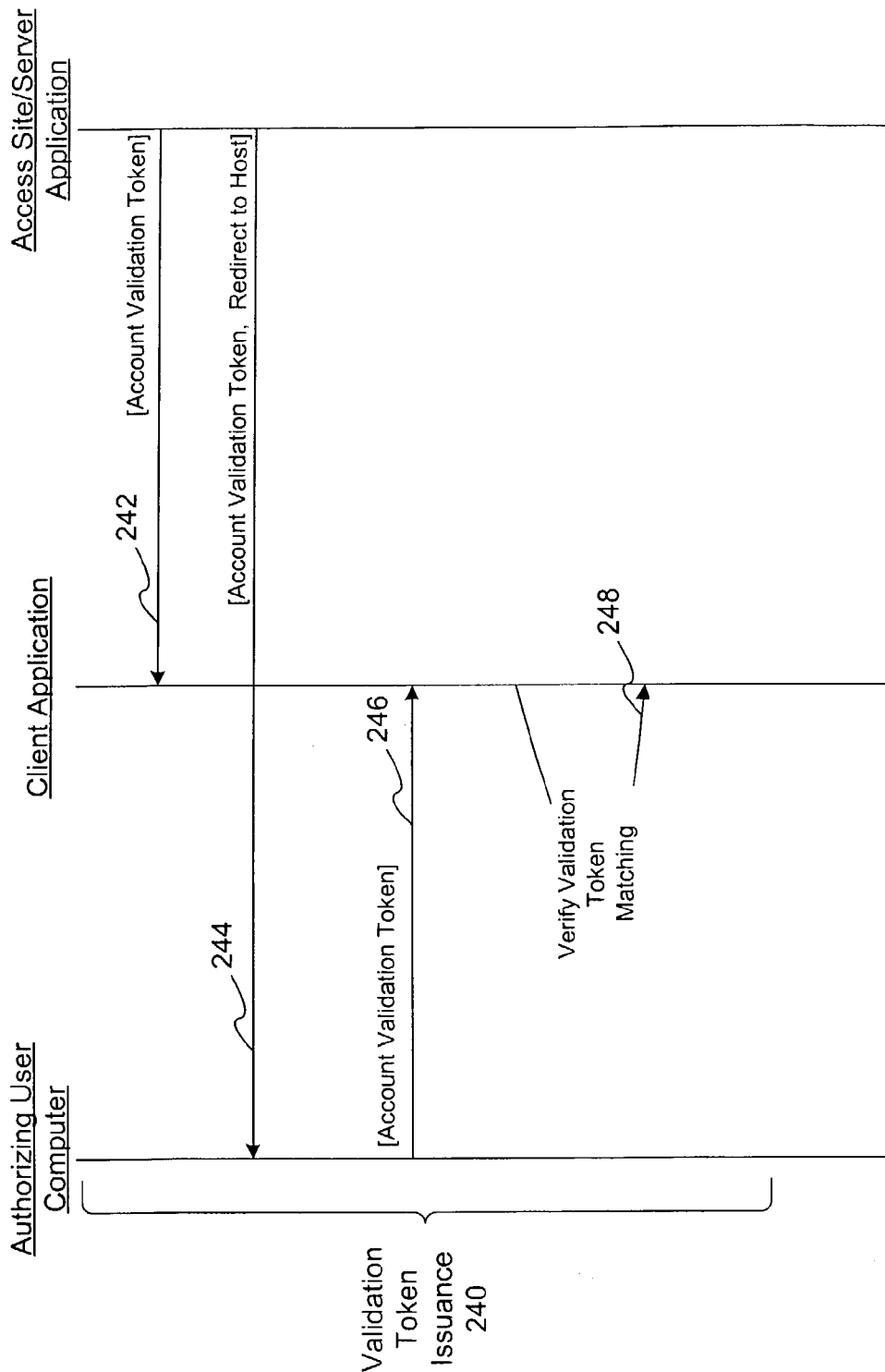

FIGS. 2A–C are event diagrams illustrating an embodiment of granting access rights in more detail. Referring first to FIG. 2A, an initial phase involves providing certificates to application developers pursuant to their registration of client applications. This may be referred to as the certificate issuance 202 phase. The function provided by the access site with respect to this phase can also be referred to as a self-service certificate authority. It provides a system wherein client applications identify themselves with public key certificates. The self-service certificate authority allows registered application developers to reserve application names, and enables a guarantee to subscribers that each application name is unique and cannot be forged. The certificate authority does not necessarily have to verify or bear any responsibility regarding the actual identity of the application developer. Certificate issuance 202 involves the submission 204 by the application developer of an application identifier (App_ID), which may be a name of the application, and a corresponding request for the certificate. The access site determines the originality by comparing the submitted App_ID to a database of existing identifiers and issues 206 the certificate where App_ID is determined to be original. The access site may provide various instructions and limitations on the content of each App_ID during both original registration of a developer, and certificate issuance, to assist developers in providing appropriate identifiers. The communications between the client site and the access site in requesting and issuing the certificate may be encrypted or otherwise secured, such as by using communications incorporating Secure Sockets Layer (SSL) or Transport Layer Security (TSL) protocols, or the like.

At some point, the subscriber is registered or otherwise recognized in some fashion by the server application. This can be accommodated using any conventional procedures that server applications use to collect information from and register users. This can take place before the subscriber has any contact with the client application, or at any other time up to the point where the features of the client application that invoke the server application are requested by the subscriber. Indeed, the information may be provided by the subscriber to the server application as part of the process of granting access rights to the client application. The actual information collected is specific to whatever the server application requires. For example, it may use a payment model and therefore request credit card and other information to set up the account. Additionally, specific company and related information may also be collected. For example, for the online accounting application, the subscriber may indicate whether they are a sole proprietor, "S" corporation, or other form; whether customers are called customers, clients, donors, patients, etc. Preferably, this account information is collected and maintained by the server application, to free the access site from having to be concerned with such information. However, the access site could perform a registration function as well, if desired.

The client site provides web pages for interfacing with potential subscribers. As described above, a subscriber may navigate to a page pertaining to a client application and indicate 210 that he would like to use features of the client application that integrate with the server application. Pursuant to such an indication, an approved subscriber verification phase 208 provides confirmation that a subscriber contacting the server application is a legitimate user of the client application. Particularly, upon receipt of the indication that the subscriber would like to use such features, the client application generates a confirmation code that is sent 212 to the subscriber. The confirmation code can be any unique piece of information, typically dictated by the client application. For example, the confirmation code can be any number or alphanumeric string. The subscriber is also redirected 212 to the access site by a redirect command that directs the subscriber to the access site. The redirect may also include information that specifically directs the user to a particular server application, and may also include information that allows the access site to automatically respond once the subscriber is navigated to the access site.

The confirmation code is also separately sent 214 to the access site. Preferably, the client application uses the previously issued certificate as the basis for an SSL conversion used for the communication of the confirmation code to the access site. This provides an added level of security as the communication is authenticated as having come from the client application, which possesses the certificate. Ideally, all communications between the client application and the access site/server application can be encrypted as such, to ensure that all such communications have come from the trusted source. One preferred protocol is SSL, using a public key pair signed by another public key for the certificate; however, any protocol or certificate could be used, such as Transport Layer Security or the like.

The access site retains 216 the confirmation code, such as by storing it in a local database in association with identifying information for the client site and/or client application, and awaits contact by the subscriber. As indicated, the subscriber had been redirected to the access site. Preferably, the confirmation code is sent 218 to the access site by the subscriber automatically, in conjunction with the redirect command. Alternatively, the subscriber may be separately asked to submit the confirmation code to the access site. Regardless, possession of a matching confirmation code by the client application and the subscriber, and possession of the certificate by the client application, helps to ensure that the subscriber is communicating with the access site pursuant to arrangements made with a registered client application. It also helps prevent others from navigating to the access site for erroneous or fraudulent account establishment. The access site can also provide another measure of security by examining information about the client site and/or client application sending the confirmation code. For example, the access site may retain the address of the client site and ensure that the confirmation code is coming from a valid address. Once the confirmation codes have been received, verification 220 involves a comparison of the code sent by the subscriber to the one sent by the client application.

The access site then arranges a proxy account. Generally, the proxy account is a vehicle through which the client application accesses the server application according to access rights specified by the subscriber. The proxy account is preferably managed in conjunction with the server application. More particularly, the access sites generally initiates the proxy account and manages the existence of the proxy account, and the server application manages details such as particular access rights defined under the proxy account.

The proxy account is arranged 230 as follows. Since the client application had been previously registered with the access site, the access site is able to send 232 a tailored message to the subscriber, conveying the type of access being requested of the server application by the client application. Generally, the message will invite the subscriber to log in and grant access rights to the client application. Again, conventional interfaces can be used to request and receive such information. For example, the message may be in the form of a web page having fields for collecting the necessary information. The subscriber completes the necessary information and submits 234 the information to the access site.

The access site creates 236 and maintains the proxy account according to authorized users identified by the subscriber. The proxy account will later be usable by the client application to access subscriber data based on behalf of the subscriber, restricted as needed by the associated access rights. The proxy account is identified by an account identifier. That identifier is anything that can identify each proxy account, such as a number, alphanumeric string, code, or the like, and is referred to herein as Account_ID. For example, Account_ID may be the name Company_Name, or may be the name of a person, etc. As indicated, the access site maintains the existence of the account generally. The access site could also maintain the particulars regarding granted access rights, but preferably those are separately managed by the server application. As described, in the latter case the exchange between the access site and the server application to create the proxy account includes redirecting the subscriber to the server application, communicating with the subscriber to establish the details of the proxy account, and reporting back to the access site to confirm that the proxy account has been established. The proxy account can be identified by the Account_ID, with the access site generally managing the existence of the proxy account and screening subsequent access to the server application by the client application, and the server application applying the particulars under the proxy account.

In one alternative, "login security" can also be associated with a proxy account as described above. Generally, when the login security option is selected the subscriber choose particular users who must login when the client application seeks to access the server application according to the otherwise specified access rights. If login security is enabled, then the server application will later request login credentials, such as a username and password for a particular authorized user, when the client application seeks to access subscriber data through the server application. The login security feature is described further with reference to FIG. 3 below.

Referring to FIG. 2C, a validation token is also issued 240 in association with the proxy account. The validation token can be any unique identifier corresponding to the created proxy account. In one embodiment, the validation token comprises a random code with an appended identifier particular to the created proxy account. There are numerous alternatives for the validation token, including those that are merely the proxy account identifier. The validation token is provided 242 to the client application, which may later use the validation token in connection with accessing the server application on behalf of the subscriber.

Optionally, a confirmation procedure may also be undertaken among the access site, client application, and subscriber, as shown. There, the validation token is provided 244 to the subscriber as well, along with a redirect to the client application. The subscriber is thus prompted to send 246 the validation token to the client application, which then verifies 248 that the validation token sent by the access site matches the one sent by the subscriber.

The client application retains the validation token and later uses it to access the server application on behalf of the subscriber. The client application is free to make arrangements with the subscriber directly as to how and when such access is to be applied. For example, the subscriber may separately require the client application to have an affirmation such as a user login in order to use the validation token. As with transmission of the confirmation code during the arrangement of the proxy account, the client application can use a security protocol using the client application certificate for communicating the validation token, as well as following communications to access the server application and process subscriber data.

Figure 3:
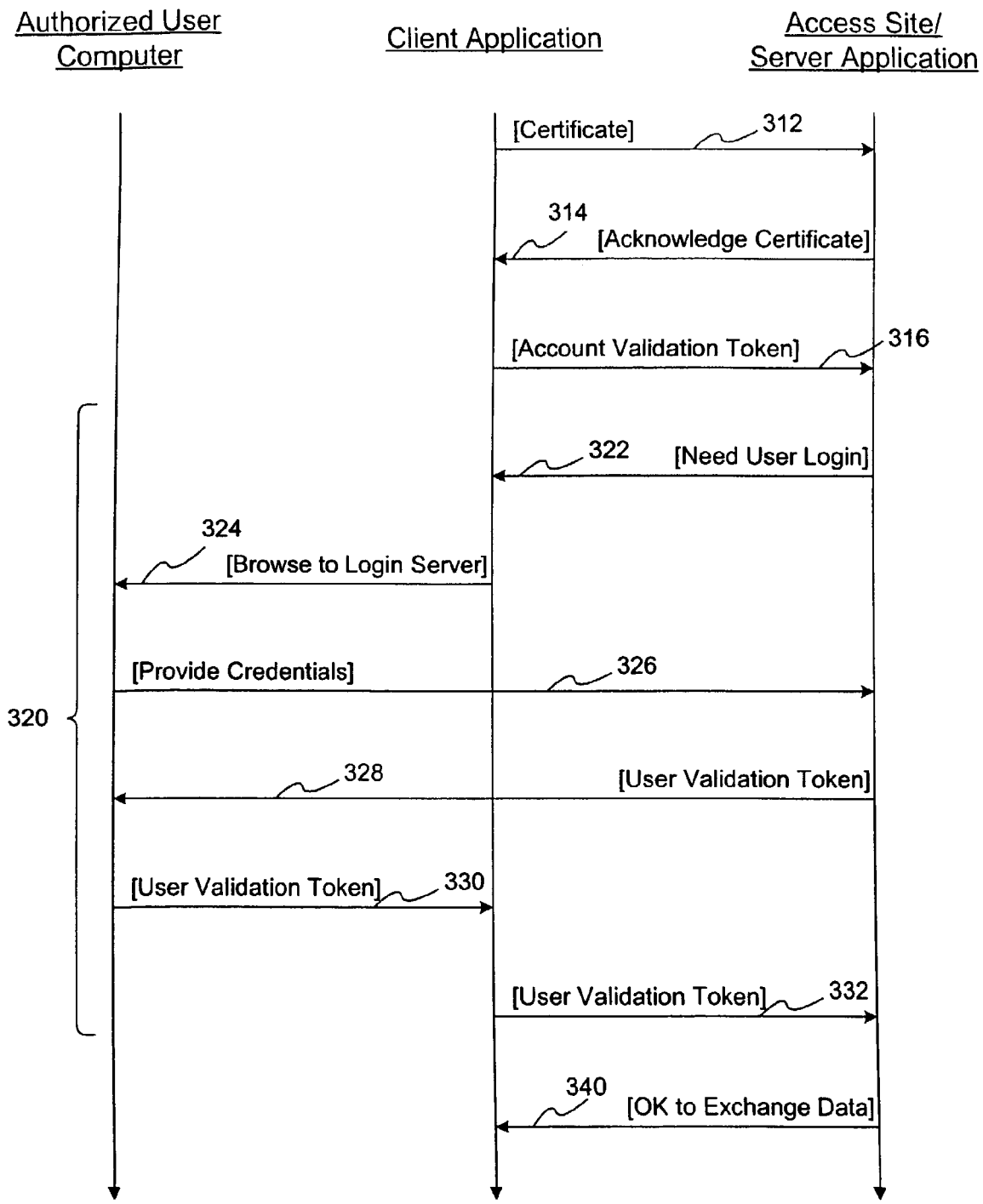
FIG. 3 is an event diagram illustrating an embodiment of processing subscriber data pursuant to granted access rights in accordance with the present invention.

FIG. 3 illustrates an embodiment of processing subscriber data pursuant to previously granted access rights, including embodiments that provide the login security option. A client application may variously request the server application to process subscriber data. For example, the client application may unilaterally make a request, or a user may prompt the client application to make the request.

Processing subscriber data according to this embodiment involves three different security aspects. First, the self-service certification scheme uniquely identifies the client application as having been registered with the access site. A security protocol implementing the certificate allows the access site, server application and client application to securely communicate. The client application also presents the account validation token, which generally governs access to the proxy account corresponding to the validation token. Finally, login security ensures that the request is on behalf of an authorized user.

As indicated in FIG. 3, to access the server application and corresponding subscriber data, the client application initially sends 312 its certificate to the access site. The access site maintains a correlation of certificates to registered client applications, and recognizes an appropriate certificate. The access site then acknowledges 314 the certificate, which prompts the client application to send 316 the account validation token to the access site. The access site receives the validation token and associates it to the proxy account using the information retained during the creation of the proxy account.

As described above, additional login security may have been established in connection with the proxy account. If login security is not required, then the presentation of the certificate and then the account validation token are sufficient indicia to allow access to the server application and subscriber data according to the settings defined by the proxy account. Accordingly, confirmation that access is allowed is communicated 340 to the client application.

If login security is enabled for the proxy account, then a login security phase 320 is invoked, to ensure that access by the client application is associated with a request by a particular authorized user. Initially, this involves sending 322 a code indicating that user login is required to the client application. The client application is configured to recognize this code, and to prompt the particular authorized user to browse 324 to the login server (preferably the access site, but could equally be the server application if the server application is directly handling the login security aspect of the proxy account), and to then provide 326 credentials. The communication is in conjunction with the previous presentation of the validation token, which is correlated to the proxy account, which in turn identifies the list of users who may login. The credentials are preferably in the form of a user name and password, although any login credential can be used, including but not limited to a code or key, biometric data, a code that uniquely identifies the authorized user's machine, etc.

The access site receives and verifies appropriate credentials corresponding to the proxy account, and then sends 328 a user validation token to the authorized user. Like the account validation token, the user validation token can be any kind of unique code, number or the like. The authorized user sends 330 the user validation token to the client application, which in turn sends 332 it to the access site. Receipt of the user validation token from the client application indicates to the access site that the client application request is associated with the "logged in" authorized user, and thus prompts an indication 340 and corresponding approval of the data exchange through the proxy account.

Figure 4:
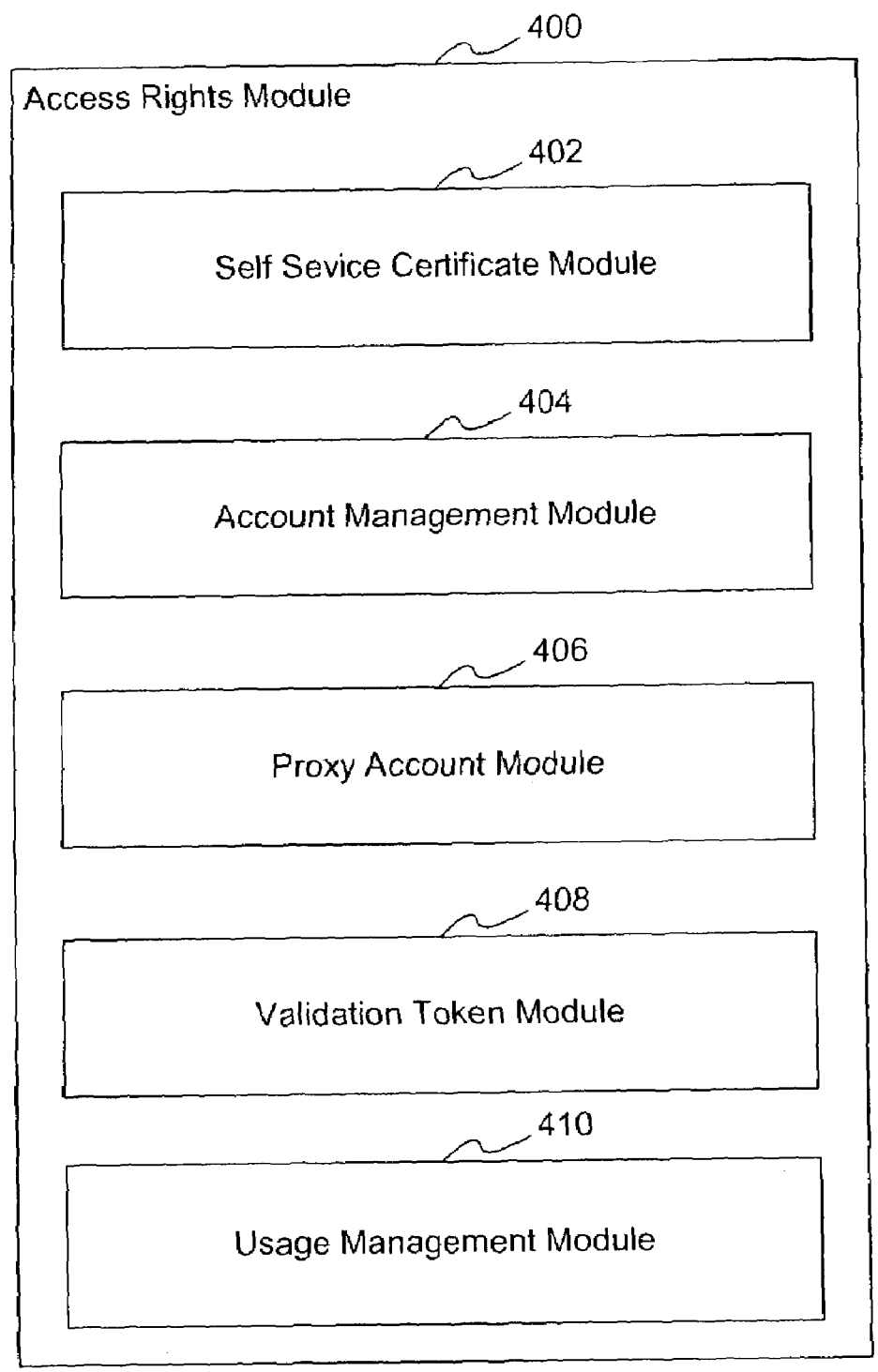
FIG. 4 is a block diagram illustrating an embodiment of an access rights module in accordance with the present invention.

FIG. 4 illustrates an embodiment of an access rights module 400. The access rights module 400 is generally configured to provided client application certificates, establish accounts for subscribers and developers, establish proxy accounts and validation tokens, allowing a client application to access a server application on behalf of an end user, with definable access rights. Although modular breakdown of the access rights module 400 is shown, access rights functionality similar or identical to that described herein may be provided using fewer or more modules that produce the same overall functionality. The access rights module 400 is preferably provided as software, although it may also include hardware and firmware elements, or combinations thereof. The software may be variously stored in memory, and in a computer system provides the described functionality upon execution by a processor. The computer system may correspond to a server that may be referred to as an access site or access management site because of the provided functionality. Such a system may also include a server application whose access is governed by the access rights module. Alternatively the server application may reside on another server. The software may also be embodied on storage media including but not limited to floppy disc, CD, DVD, hard disk, tape, etc.

The illustrated access rights module 400 includes a self-service certificate module 402, an account management module 404, a proxy account module 406, a validation token module 408, and a usage management module 410.

The self-service certification module 402 receives developer submissions of application identifiers and provides corresponding certificates. The functionality of the self-service certification module 402 is described further above (FIG. 2A, certificate issuance 202). The account management module 404 includes routines for managing subscriber accounts. It includes conventional routines for providing and managing a subscriber data base, and for requesting information to be provided in the data base for registering subscribers. The account management module 404 also includes routines for communicating with a client application upon an initial request by a subscriber to set up an account, receive confirmation codes from the client application, and match those confirmation codes to those independently submitted to the access rights module 400 by subscribers. As described above, server applications will often manage the particulars of subscriber accounts. In those circumstances, the account management module does not need to duplicate all of the account information that the server application handles according to its conventional requirements.

In conjunction with the proxy account module 406, the account management module 404 includes routines that allow a subscriber to set up a proxy account, which allows the client application to appropriately request a server application to process subscriber data, as described above. This preferably involves the presentation of interfaces to the subscriber requesting selections that identify an account, and corresponding access rights settings.

The validation token module 408 communicates with the account management module 404, and generates account validation tokens corresponding to created proxy accounts, and user validation tokens where access is requested and login security is enabled.

The proxy account module 406 maintains information corresponding to created proxy accounts. As indicated previously, in some embodiments, an access site will maintain the information that generally identifies the proxy account and allows the access site to confirm that a client application is legitimately attempting to use a proxy account, whereas an application server will manage the specified access rights defined under the proxy account. In that circumstance, some functionality provided by the proxy account module 406 could alternatively be provided by similar software at the server application.

Finally, the usage management module 410 generally allows a client application to request subscriber data processing based upon the previously defined accounts and access rights settings. Particularly, the usage management module 410 may receive a certificate from a client application and then verify that the client application has been registered with the system, such as by querying the certificate module 402. The usage management module 410 communicates with client applications to confirm certificate validation, and receives account validation tokens which are correlated to maintained proxy accounts. Particularly, the usage management module 410 receives a account validation token for a proxy account, and communicates with the other modules to verify the presence of the proxy account and the association of the validation token to the proxy account. The usage management module 410 then allows the server application to process subscriber data according to the access rights defined by the proxy account, whereupon the server application may return appropriate results to the client application. Where login security is provided, the usage management module 410 identifies that such is the case through communication with the proxy account module 406, then prompts the submission of login credentials from an authorized user, typically through commands initially provided to the client application, then recognizes and approves the credentials provided by the authorized user. Where appropriate, the usage management module 410 then communicates with the validation token module 408, issues a user validation token to the user, and awaits receipt of the same from the client application as described above, whereupon the access site allowed the server application to process subscriber data according to the request.

Thus, systems, methods and apparatus for managing databases are provided in accordance with the present invention. Although the present invention has been described in considerable detail with reference to certain preferred embodiments thereof, other embodiments are possible. Therefore, the sprit and scope of the appended claims should not be limited to the description of the preferred embodiments contained herein.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magneto-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems appears in the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer implemented method for granting access to a server application by a client application on behalf of a subscriber, the method comprising:
   receiving a confirmation code from the client application;
   receiving a confirmation code from the subscriber;
   verifying that the confirmation code received from the client application matches the confirmation code received from the subscriber to confirm a subscriber request to implement features of the client application that use the server application;
   responsive to verifying that the confirmation code received from the client application matches the confirmation code received from the subscriber:
      receiving from the subscriber a specified set of access rights for the client application;
      providing a validation token to the client application in connection with the specified set of access rights;
      receiving a request to process subscriber data using the server application from the client application;
      receiving the validation token from the client application in association with the request; and
      granting the request to process subscriber data responsive to receiving the request and validation token.

2. The method of claim 1, wherein the validation token is also provided to the subscriber, whereby a subsequent exchange between the subscriber and the client application can confirm appropriate issuance of the validation token.

3. The method of claim 1, further comprising:
determining whether the subscriber has enabled a security login protocol in association with the specified set of access rights; and
associating a set of credential information to an authorized user for use in the security login protocol.

4. The method of claim 3, further comprising:
upon receipt of the validation token from the client application, determining that the security login protocol is associated with the specified set of access rights; and
requesting a set of submitted credential information.

5. The method of claim 4, further comprising:
providing a user validation token to the authorized user when the set of submitted credential information matches the set of credential information.

6. The method of claim 4, further comprising:
granting the request to process subscriber data after receiving the user validation token from the client application.

7. The method of claim 5, wherein the set of credential information comprises a username and a password.

8. The method of claim 1, further comprising:
issuing a certificate that is uniquely associated to the client application; and
using the certificate to verify that the confirmation code is received from the client application.

9. The method of claim 1, further comprising:
maintaining a proxy account that is associated with the specified set of access rights, and that is invoked using the validation token.

10. A computer program product, for granting access to a server application by a client application on behalf of a subscriber, the computer program product stored on a computer readable medium and adapted to perform operations comprising:
receiving a confirmation code from the client application;
receiving a confirmation code from the subscriber;
verifying that the confirmation code received from the client application matches the confirmation code received from the subscriber to confirm a subscriber request to implement features of the client application that use the server application;
responsive to verifying that the confirmation code received from the client application matches the confirmation code received from the subscriber:
receiving from the subscriber a specified set of access rights for the client application;
providing a validation token to the client application in connections with the specified set of access rights;
receiving a request to process subscriber data using the server application from the client application;
receiving the validation token from the client application in association with the request; and
granting the request to process subscriber data responsive to receiving the request and validation token.

11. The computer program product of claim 10, wherein the validation token is also provided to the subscriber, whereby a subsequent exchange between the subscriber and the client application can confirm appropriate issuance of the validation token.

12. The computer program product of claim 10, wherein the operations further comprise:
determining whether the subscriber has enabled a security login protocol in association with the specified set of access rights; and
associating a set of credential information to an authorized user for use in the security login protocol.

13. The computer program product of claim 12, wherein the operations further comprise:
upon receipt of the validation token from the client application, determining that the security login protocol is associated with the specified set of access rights; and
requesting a set of submitted credential information.

14. The computer program product of claim 13, wherein the operations further comprise:
providing a user validation token to the authorized user when the set of submitted credential information matches the set of credential information.

15. The computer program product of claim 13, wherein the operations further comprise:
granting the request to process subscriber data after receiving the user validation token from the client application.

16. The computer program product of claim 14, wherein the set of credential information comprises a username and a password.

17. The computer program product of claim 10, wherein the operations further comprise:
issuing a certificate that is uniquely associated to the client application; and
using the certificate to verify that the confirmation code is received from the client application.

18. The computer program product of claim 10, wherein the operations further comprise:
maintaining a proxy account that is associated with the specified set of access rights, and that is invoked using the validation token.

19. An access rights apparatus for granting access to a server application by a client application on behalf of a subscriber, the apparatus comprising:
an account management module, which receives a confirmation code from the client application and, receives a confirmation code from the subscriber, and verifies that the confirmation code received from the client application matches the confirmation code received from the subscriber to confirm a subscriber request to implement features of the client application that use the server application;
a proxy account module, in communication with the account module, which receives from the subscriber a specified set of access rights for the client application after the account management module verifies that the confirmation code received from the client application matches the confirmation code received from the subscriber;
a validation token module, in communication with the proxy account module, which provides a validation token to the client application in connection with the specified set of access rights; and
a usage management module, in communication with the validation token module, which receives a request to process subscriber data using the server application from the client application; receives the validation token from the client application in association with the request; and grants the request to process subscriber data responsive to receiving the request and validation token.

20. The apparatus of claim 19, wherein the validation token is also provided to the subscriber, whereby a subsequent exchange between the subscriber and the client application can confirm appropriate issuance of the validation token.

21. The apparatus of claim 19, wherein the usage management module also determines whether the subscriber has enabled a security login protocol in association with the specified set of access rights; and associates a set of credential information to an authorized user for use in the security login protocol.

22. The apparatus of claim 21, wherein the usage management module also determines that the security login protocol is associated with the specified set of access rights; and requests a set of submitted credential information after receipt of the validation token.

23. The apparatus of claim 22, wherein the usage management module provides a user validation token to the authorized user when the set of submitted credential information matches the set of credential information.

24. The apparatus of claim 23, wherein the usage management module grants the request to process subscriber data after receiving the user validation token from the client application.

25. The apparatus of claim 23, wherein the set of credential information comprises a username and a password.

26. The apparatus of claim 19, further comprising:
a certificate module, which issues a certificate that is uniquely associated to the client application, wherein the certificate is used to verify that the confirmation code is received from the client application.

27. An apparatus for granting access to a server application by a client application on behalf of a subscriber, the apparatus comprising:
means for receiving a confirmation code from the client application;
means for receiving a confirmation code from the subscriber;
means for verifying that the confirmation code received from the client application matches the confirmation code received from the subscriber to confirm a subscriber request to implement features of the client application that use the server application;
means for receiving from the subscriber a specified set of access rights for the client application after verifying that the confirmation code received from the client application matches the confirmation code received from the subscriber;
means for providing a validation token to the client application in connection with the specified set of access rights; and
a usage management means, for receiving a request to process subscriber data using the server application from the client application; receiving the validation token from the client application in association with the request; and granting the request to process subscriber data responsive to receiving the request and validation token.

28. The apparatus of claim 27, wherein the validation token is also provided to the subscriber, whereby a subsequent exchange between the subscriber and the client application can confirm appropriate issuance of the validation token.

29. The apparatus of claim 27, wherein the usage management means is also for determining whether the subscriber has enabled a security login protocol in association with the specified set of access rights; and associating a set of credential information to an authorized user for use in the security login protocol.

30. The apparatus of claim 29, wherein the usage management means is also for determining that the security login protocol is associated with the specified set of access rights; and requesting a set of submitted credential information after receipt of the validation token.

31. The apparatus of claim 30, wherein the usage management means provides a user validation token to the authorized user when the set of submitted credential information matches the set of credential information.

32. The apparatus of claim 31, wherein the usage management means grants the request to process subscriber data after receiving the user validation token from the client application.

33. The apparatus of claim 31, wherein the set of credential information comprises a username and a password.

34. The apparatus of claim 27, further comprising:
certification means, for issuing a certificate that is uniquely associated to the client application, wherein the certificate is used to verify that the confirmation code is received from the client application.

35. A computer implemented method for granting access to a server application by a client application on behalf of a subscriber, the method comprising:
receiving a confirmation code from the client application;
receiving a confirmation code from the subscriber;
verifying that the confirmation code received from the client application matches the confirmation code received from the subscriber to confirm a subscriber request to implement features of the client application that use the server application;
responsive to verifying that the confirmation code received from the client application matches the confirmation code received from the subscriber:
receiving from the subscriber a specified set of access rights for the client application;
associating a security login protocol with the specified set of access rights, the security login protocol identifying an authorized user and a corresponding set of credential information;
providing a validation token to the client application in connection with the specified set of access rights;
receiving a request to process subscriber data using the server application from the client application;
receiving the validation token from the client application in association with the request;
requesting a set of submitted credential information and issuing a user validation token when the set of submitted credential information matches the set of credential information; and
granting the request to process subscriber data responsive to receiving the validation token and the user validation token.

36. The method of claim 35, wherein the validation token is also provided to the subscriber, whereby a subsequent exchange between the subscriber and the client application can confirm appropriate issuance of the validation token.

37. The method of claim 35, wherein the set of credential information comprises a username and a password.

38. The method of claim 35, further comprising:
issuing a certificate that is uniquely associated to the client application; and
using the certificate to verify that the confirmation code is received from the client application.

39. A computer program product, for granting access to a server application by a client application on behalf of a subscriber, the computer program product stored on a computer readable medium and adapted to perform operations comprising:
  receiving a confirmation code from the client application;
  receiving a confirmation code from the subscriber;
  verifying that the confirmation code received from the client application matches the confirmation code received from the subscriber to confirm a subscriber request to implement features of the client application that use the server application;
  responsive to verifying that the confirmation code received from the client application matches the confirmation code received from the subscriber:
    receiving from the subscriber a specified set of access rights for the client application;
    associating a security login protocol with the specified set of access rights, the security login protocol identifying an authorized user and a corresponding set of credential information;
    providing a validation token to the client application in connection with the specified set of access rights;
    receiving a request to process subscriber data using the server application from the client application;
    receiving the validation token from the client application in association with the request;
    requesting a set of submitted credential information and issuing a user validation token when the set of submitted credential information matches the set of credential information; and
    granting the request to process subscriber data responsive to receiving the validation token and the user validation token.

40. The computer program product of claim 39, wherein the validation token is also provided to the subscriber, whereby a subsequent exchange between the subscriber and the client application can confirm appropriate issuance of the validation token.

41. The computer program product of claim 39, wherein the set of credential information comprises a username and a password.

42. The computer program product of claim 39, wherein the operations further comprise:
  issuing a certificate that is uniquely associated to the client application; and
  using the certificate to verify that confirmation code is received from the client application.

43. A computer implemented method for granting a client application access rights to a server application on behalf of a subscriber, the method comprising:
  providing a confirmation code to an access site;
  providing the confirmation code to the subscriber;
  directing the subscriber to the access site to provide the confirmation code, thereby allowing the access site to confirm a subscriber request to implement features of the client application that use the server application, and to provide a specified set of access rights for the client application;
  receiving a validation token from the access site, the validation token being issued after receipt of the confirmation code and being associated to the specified set of access rights; and
  submitting a request to process subscriber data and the validation token to the server application to prompt the access site to grant the request to process subscriber data.

44. The method of claim 43, further comprising:
  confirming appropriate issuance with of the validation token by determining that the subscriber has also received the validation token.

45. The method of claim 43, further comprising:
  receiving an indication that a security login protocol is associated with the specified set of access rights; and
  directing a user to the access site to submit credential information to the access site in connection with the security login protocol.

46. The method of claim 45, further comprising:
  receiving a user validation token from the subscriber in connection with properly submitted credential information according to the security login protocol, and sending the user validation token to the access site.

47. The method of claim 43, further comprising:
  receiving a certificate that is uniquely associated to the client application; and
  applying a security protocol that uses the certificate to communicate the confirmation code to the access site.

48. A computer program product, for granting a client application access rights to a server application on behalf of a subscriber, the computer program product stored on a computer readable medium and adapted to perform operations comprising:
  providing a confirmation code to an access site;
  providing the confirmation code to the subscriber;
  directing the subscriber to the access site to provide the confirmation code, thereby allowing the access site to confirm a subscriber request to implement features of the client application that use the server application, and to provide a specified set of access rights for the client application;
  receiving a validation token from the access site, the validation token being issued after receipt of the confirmation code and being associated to the specified set of access rights; and
  submitting a request to process subscriber data and the validation token to the server application to prompt the access site to grant the request to process subscriber data.

49. The computer program product of claim 48, wherein the operations further comprise confirming appropriate issuance of the validation token by determining that the subscriber has also received the validation token.

50. The computer program product of claim 48, wherein the operations further comprise:
  receiving an indication that a security login protocol is associated with the specified set of access rights; and
  directing a user to the access site to submit credential information to the access site in connection with the security login protocol.

51. The computer program product of claim 50, wherein the operations further comprise:
  receiving a user validation token from the subscriber in connection with properly submitted credential information according to the security login protocol, and sending the user validation token to the access site.

52. The computer program product of claim 48, further comprising:
  receiving a certificate that is uniquely associated to the client application; and
  applying a security protocol that uses the certificate to communicate the confirmation code to the access site.

53. A computer implemented method wherein a subscriber grants access to a server application by a client application on behalf of the subscriber, the method comprising:
- requesting an implementation of the features of the client application that use the server application;
- receiving a confirmation code from the client application in response to requesting the implementation, wherein the client application also provides the confirmation code to an access site;
- submitting the confirmation code to the access site;
- responsive to the access site verifying that the submitted confirmation code matches the confirmation code received from the client application, submitting a specified set of access rights for the client application to the access site;
- receiving from the access site a validation token in association with the specified set of access rights;
- communicating with the client application to determine that the client application separately received the validation token and thereby confirm that the client application has been granted the specified set of access rights.

54. The method of claim 53, further comprising:
- enabling a security login protocol in association with the specified set of access rights; and
- identifying an authorized user for use in the security login protocol, the authorized user having a set of credential information, whereby the specified set of access rights can be implemented by the client application only where a user logs in by providing the set of credential information.

55. A computer program product, for allowing a subscriber to grant access to a server application by a client application on behalf of the subscriber, the computer program product stored on a computer readable medium and adapted to perform operations comprising:
- requesting an implementation of the features of the client application that use the server application;
- receiving a confirmation code from the client application in response to requesting the implementation, wherein the client application also provides the confirmation code to an access site;
- submitting the confirmation code to the access site;
- responsive to the access site verifying that the submitted confirmation code matches the confirmation code received from the client application, submitting a specified set of access rights for the client application to the access site;
- receiving from the access site a validation token in association with the specified set of access rights;
- communicating with the client application to determine that the client application separately received the validation token and thereby confirm that the client application has been granted the specified set of access rights.

56. The computer program product of claim 55, wherein the operations further comprise:
- enabling a security login protocol in association with the specified set of access rights; and
- identifying an authorized user for use in the security login protocol, the authorized user having a set of credential information, whereby the specified set of access rights can be implemented by the client application only where a user logs in by providing the set of credential information.

* * * * *

UNITED STATES PATENT AND TRADEMARK OFFICE
CERTIFICATE OF CORRECTION

PATENT NO. : 7,024,689 B2
APPLICATION NO. : 10/318569
DATED : April 4, 2006
INVENTOR(S) : William O'Donnell and Daniel Wilks It is certified that error appears in the above-identified patent and that said Letters Patent is hereby corrected as shown below:

Claim 10, Column 17, Line 55, replace "connections" with --connection--.

Claim 19, Column 18, Line 43, after "subscribers" delete "and".

Claim 42, Column 21, Line 46, insert --the-- before "confirmation code".

Signed and Sealed this

First Day of August, 2006

JON W. DUDAS
*Director of the United States Patent and Trademark Office*